No. 695,215. Patented Mar. 11, 1902.
S. LAKE.
SUBMARINE BOAT.
(Application filed Dec. 16, 1901.)
(No Model.)
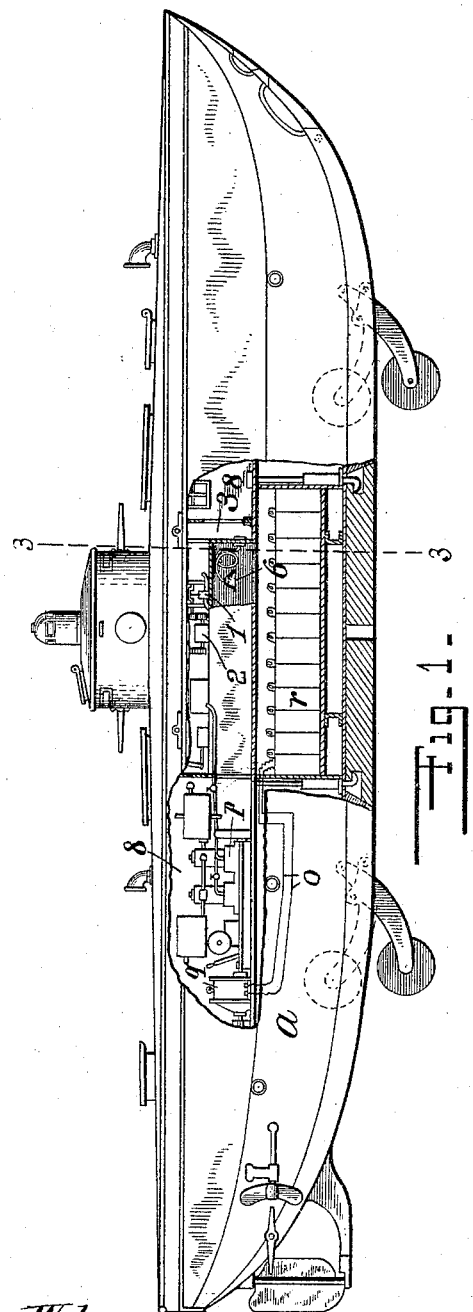
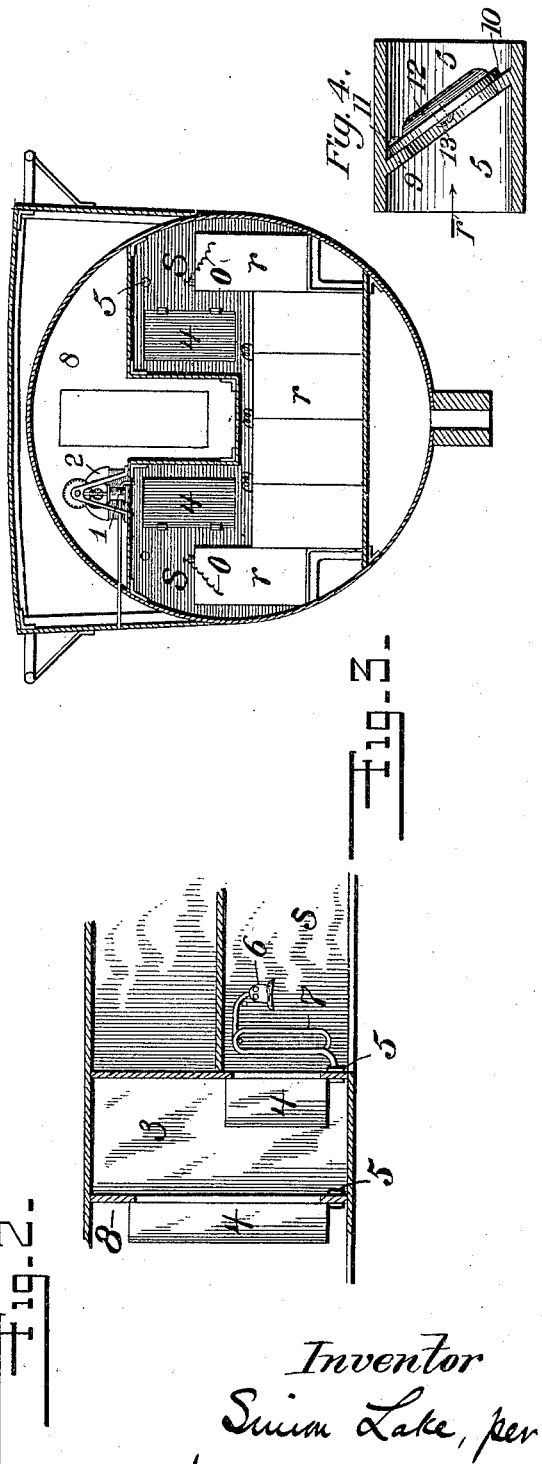
Witnesses:
J. B. McGiver.
A. Konnemann.
Inventor
Simon Lake, per
Henry J. Miller, Atty.

UNITED STATES PATENT OFFICE.

SIMON LAKE, OF BRIDGEPORT, CONNECTICUT.

SUBMARINE BOAT.

SPECIFICATION forming part of Letters Patent No. 695,215, dated March 11, 1902.

Original application filed May 28, 1901, Serial No. 62,207. Divided and this application filed December 16, 1901. Serial No. 86,106. (No model.)

*To all whom it may concern:*

Be it known that I, SIMON LAKE, a citizen of the United States, and a resident of Bridgeport, in the county of Fairfield and State of Connecticut, have invented certain new and useful Improvements in Submarine Boats, of which the following is a specification.

This application is a division of my pending application, Serial No. 62,207, filed May 28, 1901.

One of the sources of danger heretofore existing in submarine boats employing a series of storage batteries for supplying power for making submerged runs for electric-lighting and other purposes has been the generation of fumes and gases in charging said batteries which created in the battery chamber or compartment an atmosphere into which it was unsafe for an attendant to venture or to remain for any considerable time during such charging operation for the care of the batteries. To obviate this difficulty and prevent the escape of said gases into other parts of the boat in which is installed also a generator connected with the motive power of the boat, I not only provide for the removal from said chamber or compartment of such fumes and gases emitted from the batteries by inducing a current of atmospheric air through the same at such time, but employ a discharge or eduction pipe leading from said compartment directly to the exterior of the boat. I further preferably provide an air-lock having doors and inwardly-opening air-inlet check-valves between the same and the battery-compartment and the interior of the boat, respectively, whereby a current of atmospheric air is constantly induced from the adjoining compartment, which may contain the generator, through the air-lock to the battery-compartment, the tendency of the current in the latter being thus outwardly, so as to carry away not only the battery-fumes, but the vitiated air and gases or vapors that may be generated in the other portions of the boat.

While I have myself for several years past employed in actual practice a circulation of air through a compartment containing storage batteries serving to carry off the battery fumes and gases, I make no claim, broadly, herein to such expedient, being aware that it has much longer been the practice, since the commercial introduction of systems of storage batteries into buildings for supplying electric current for lighting and other purposes, to induce a circulation of air in the room or compartment containing such batteries for carrying off the noxious fumes and gases set free in charging the batteries, in order to prevent their escape into adjoining rooms or compartments. I am not aware, however, that prior to my invention a submarine boat has ever been provided with a complete electric generating and storing plant, the chamber or compartment containing the storage batteries being provided with an air-inlet pipe and an outlet or discharge pipe leading outwardly therefrom to the exterior of the boat and means for inducing a flow of air through said battery-compartment and through said inlet and discharge pipes for carrying off the fumes and gases set free during the charging of said batteries from said generator, nor that a storage-battery chamber or compartment has ever been provided with an air-lock for access thereto from adjoining portions of the boat, thereby insuring the retention of the battery-fumes from permeating other adjacent compartments.

The present invention consists, therefore, primarily in a submarine boat having a system of storage batteries and a generator from which said batteries may be charged, a valved air-inlet into the chamber or compartment containing said storage batteries, a valved outlet or discharge pipe leading outwardly from said chamber or compartment to the exterior of the boat, and means for inducing a circulation of air through said chamber or compartment by way of said inlet and outlet or discharge pipes.

It also includes an air-lock having doors communicating, respectively, with said chamber or compartment and the interior of the boat and provided with similarly-communicating valved inlet-passages, through which air may be drawn into the battery chamber or compartment.

The invention further includes a helmet connected with the valved inlet to the battery chamber or compartment by a flexible hose, which helmet may be placed over the head of the attendant to insure him a fresh-air supply throughout his occupancy of the battery-compartment regardless of the atmospheric conditions within.

The invention will be understood by reference to the annexed drawings, in which—

Figure 1 is a side elevation of a submarine boat with the side partially broken away to expose the battery-compartment, the means of access thereto and devices for inducing air circulation therein, and the generator from which to charge the batteries. Fig. 2 is a sectional elevation, upon a larger scale, showing a portion of the battery-compartment and adjacent parts of the boat; and Fig. 3 is an enlarged transverse section on line 3 3 in Fig. 1. Fig. 4 is a detail sectional elevation illustrating, upon an enlarged scale, the valved inlet and outlet passages connected with the battery-compartment.

The hull $a$ is divided into several compartments, one of which, $s$, contains a series of storage batteries $r$, connected by means of the conducting-wires $o$ with a combined electric motor and generator $q$, coupled to a gasolene-engine $p$, which latter may be operated to drive the generator $q$ for charging the storage batteries when not employed in the propulsion of the boat. Another of these compartments 3, adjacent to the compartment $s$, constitutes the air-lock, which has doors 4 4 leading, respectively, into the battery-compartment $s$ and the body 8 of the boat, in which are located the generator $q$ and engine $p$. A suction-pump 1, connected with and actuated by an electric motor 2 and having its inlet-pipe connected with the battery-compartment and its exhaust leading outwardly to the exterior of the boat, as indicated in Figs. 1 and 3, is preferably employed to induce the air circulation through the battery-compartment from the interior of the boat by means of the air-inlet passages 5 5, having inwardly-opening check-valves, through which latter air is drawn by way of the air-lock to supply the partial vacuum created by means of the pump 1. The battery-compartment preferably contains a hood or helmet 6, which is connected by means of a coil of flexible tubing 7 with the inner air-inlet passage 5.

When the attendant desires to examine or repair the batteries or their connections, he merely steps into the air-lock and closes the outer door and then reaches through the doorway into the compartment $s$ for the helmet, which he applies to his head, allowing it to rest upon his shoulders, when upon entering the battery-compartment and closing the door 4 behind him he is enabled to receive through such helmet, by means of the flexible tube 7, the entire supply of fresh air entering the same and is able to move to any part of the compartment, meanwhile breathing the same air as the occupants of the boat. As the maintenance of a current of air in such compartment serves to greatly dilute, if not wholly carry away, the injurious proportion of noxious fumes and gases from its atmosphere, and any leakage between the compartments 8 and $s$ must be toward the latter while the air-pump 1 is in operation, it is obvious that although both are desirable features either the helmet or the air-lock may be dispensed with without seriously impairing the effectiveness of the apparatus.

The valved air inlet and outlet passages 5 mentioned above are preferably formed in a tubular casing having an inclined seat 9, normally closed by a flap-valve composed of a flexible leather disk 10, secured by a screw 11 to its upper side and provided with a weight 12, fastened to the inner side by means of a screw 13, and thus adapted to open inwardly in the direction of the arrow $r$ to permit the passage of air and gases through the same. The usual valve provided in the discharge-passage of the air-pump 1 is or may be of this character also.

Having thus set forth the nature of the invention, what I claim herein is—

1. In a submarine boat, a closed battery-compartment containing a series of storage batteries, an air-lock compartment having doors leading, respectively, into said battery-compartment and into the interior of said boat, an air-pump having its inlet connected with said battery-compartment and its exhaust outside of said boat, and air-inlet check-valves between said compartments affording an inflow of air to said battery-compartment from the interior of the boat.

2. In a submarine boat, a closed battery-compartment containing a series of storage batteries, an air-pump having its inlet connected with said battery-compartment and its exhaust outside of said boat, an air-inlet having a check-valve arranged to admit external air to said battery-compartment, a hood or helmet in said compartment adapted to inclose the head of an attendant, and a flexible tube connecting said hood or helmet with said air-inlet.

3. In a submarine boat, a closed battery-compartment containing a series of storage batteries, an air-inlet leading into and an air-outlet leading outward from said compartment, means for inducing a circulation of air through said compartment through said air-inlet and air-outlet, a flexible hose within said compartment connected at one end to said air-inlet, and means applied to the opposite end of said flexible hose for attachment to the head of an attendant for supplying a fresh-air supply to the latter.

4. In a submarine boat, a compartment partitioned from the interior of the boat, a hood or helmet therein, an air-inlet to said compartment, a flexible tube connecting said hood or helmet with said air-inlet, an air-outlet leading outwardly from said compartment, and means for inducing a circulation of air in said compartment through said helmet.

5. In a submarine boat, a closed battery-compartment containing a series of storage batteries, an air-pump having its inlet connected with said battery-compartment and its exhaust outside of said boat, an air-lock compartment having doors leading, respectively, into said battery-compartment and into the interior of said boat, air-inlets intermediate said compartments and having check-valves arranged to permit the passage of air from the interior of the boat through the air-lock to the battery-compartment, a hood or helmet within said battery-compartment adapted to inclose the head of an attendant, and a flexible hose connecting said hood or helmet with said air-inlet leading into said battery-compartment.

6. In a submarine boat, the combination with a closed chamber or compartment and a series of storage batteries contained therein, and an electric generator from which said storage batteries may be charged, of a valved inlet into said compartment, a valved outlet or discharge pipe connecting the said compartment with the exterior of the boat, and means for effecting a circulation of air through said compartment.

7. In a submarine boat, the combination with a closed chamber or compartment and a series of storage batteries contained therein, a second chamber or compartment and an electric generator contained therein from which said storage batteries may be charged, of a valved inlet into said battery-compartment from said generator-compartment, a valved outlet or discharge pipe connecting the said battery-compartment with the exterior of the boat, and means for effecting a circulation of air through said battery-compartment.

Signed at Elizabeth, in the county of Union and State of New Jersey, this 22d day of November, A. D. 1901.

SIMON LAKE.

Witnesses:
HENRY J. MILLER,
L. B. MILLER.